(12) United States Patent
Christianson

(10) Patent No.: US 8,319,679 B2
(45) Date of Patent: Nov. 27, 2012

(54) SYSTEMS AND METHODS FOR PREDICTING LOCATIONS OF WEATHER RELATIVE TO AN AIRCRAFT

(75) Inventor: Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 12/970,488

(22) Filed: Dec. 16, 2010

(65) Prior Publication Data

US 2012/0154209 A1    Jun. 21, 2012

(51) Int. Cl.
*G01S 13/00* (2006.01)

(52) U.S. Cl. .................. 342/26 B; 342/26 R; 342/26 A; 342/26 C; 342/26 D; 342/29

(58) Field of Classification Search .............. 342/26 R, 342/26 A, 26 B, 26 C, 26 D, 29
See application file for complete search history.

(56) References Cited

U.S. PATENT DOCUMENTS

| | | | | |
|---|---|---|---|---|
| 5,615,118 A * | 3/1997 | Frank | ...................... | 701/4 |
| 5,717,589 A * | 2/1998 | Thompson et al. | ............... | 702/3 |
| 5,945,926 A * | 8/1999 | Ammar et al. | ................. | 340/970 |
| 5,959,567 A * | 9/1999 | Wolfson et al. | ............. | 342/26 R |
| 5,974,360 A * | 10/1999 | Otsuka et al. | ..................... | 702/3 |
| 6,057,786 A * | 5/2000 | Briffe et al. | ................... | 340/975 |
| 6,199,008 B1 * | 3/2001 | Aratow et al. | ................. | 701/120 |
| 6,289,277 B1 * | 9/2001 | Feyereisen et al. | ........... | 701/528 |
| 6,384,830 B2 * | 5/2002 | Baron et al. | ................... | 345/473 |
| 6,421,603 B1 * | 7/2002 | Pratt et al. | ..................... | 701/528 |
| 6,433,729 B1 * | 8/2002 | Staggs | ............................. | 342/29 |
| 6,577,947 B1 * | 6/2003 | Kronfeld et al. | ............... | 701/528 |
| 6,707,415 B1 * | 3/2004 | Christianson | ................ | 342/26 R |
| 6,744,382 B1 * | 6/2004 | Lapis et al. | ..................... | 340/971 |
| 6,865,452 B2 * | 3/2005 | Burdon | ............................. | 701/3 |
| 6,917,860 B1 * | 7/2005 | Robinson et al. | ................. | 701/3 |
| 7,109,912 B1 * | 9/2006 | Paramore et al. | ............ | 342/26 B |
| 7,109,913 B1 * | 9/2006 | Paramore et al. | ............ | 342/26 B |
| 7,132,974 B1 * | 11/2006 | Christianson | ................ | 342/26 R |
| 7,205,928 B1 * | 4/2007 | Sweet | ........................ | 342/26 B |
| 7,307,576 B1 * | 12/2007 | Koenigs | ...................... | 342/26 R |
| 7,307,577 B1 * | 12/2007 | Kronfeld et al. | ............ | 342/26 B |
| 7,411,541 B2 * | 8/2008 | Khatwa | ........................ | 342/26 R |
| 7,486,220 B1 * | 2/2009 | Kronfeld et al. | ............ | 342/26 B |
| 7,656,343 B1 * | 2/2010 | Hagen et al. | ................ | 342/26 B |
| 7,664,601 B2 * | 2/2010 | Daly, Jr. | ............................ | 702/3 |
| 7,688,257 B1 * | 3/2010 | Christianson et al. | ........ | 342/174 |
| 7,714,767 B1 * | 5/2010 | Kronfeld et al. | ............ | 342/26 B |

(Continued)

OTHER PUBLICATIONS

Robert Windhorst, et al.; Convective weather avoidance with uncertain weather forecasts (10 pages); 28th Digital Avionics Systems Conference, Oct. 25-29, 2009.

(Continued)

*Primary Examiner* — Jack W Keith
*Assistant Examiner* — Peter Bythrow
(74) *Attorney, Agent, or Firm* — Lowe Graham Jones PLLC

(57) ABSTRACT

Systems and methods for predicting when a weather anomaly (e.g., convective cell) will intersect with an aircraft. Direction of movement and velocity information for at least one weather anomaly are received at a processor from a radar system. An intercept point for the at least one weather anomaly is determined based on the received location, direction of movement and velocity information and location and current speed information for the aircraft. Then, a first indicator based on the intercept point is displayed on a display device.

12 Claims, 2 Drawing Sheets

U.S. PATENT DOCUMENTS

| | | | |
|---|---|---|---|
| 7,932,853 B1* | 4/2011 | Woodell et al. | 342/26 B |
| 7,948,404 B2* | 5/2011 | Tran | 340/961 |
| 8,022,859 B2* | 9/2011 | Bunch et al. | 342/26 R |
| 8,059,024 B2* | 11/2011 | Christianson | 342/26 B |
| 8,063,817 B2* | 11/2011 | Christianson | 342/191 |
| 8,068,050 B2* | 11/2011 | Christianson | 342/26 B |
| 8,111,186 B2* | 2/2012 | Bunch et al. | 342/26 B |
| 2003/0016156 A1* | 1/2003 | Szeto et al. | 342/26 |
| 2003/0016158 A1* | 1/2003 | Stayton et al. | 342/29 |
| 2004/0059504 A1* | 3/2004 | Gray | 701/301 |
| 2004/0239550 A1* | 12/2004 | Daly, Jr. | 342/26 B |
| 2006/0074559 A1* | 4/2006 | Meunier | 701/301 |
| 2007/0005249 A1* | 1/2007 | Dupree et al. | 702/3 |
| 2007/0285283 A1* | 12/2007 | Bitar et al. | 340/963 |
| 2008/0158048 A1* | 7/2008 | Ridenour et al. | 342/26 B |
| 2008/0165051 A1* | 7/2008 | Khatwa | 342/26 B |
| 2008/0169962 A1* | 7/2008 | Rees et al. | 342/29 |
| 2009/0177343 A1* | 7/2009 | Bunch et al. | 701/14 |
| 2010/0292871 A1* | 11/2010 | Schultz et al. | 701/3 |

OTHER PUBLICATIONS

Love, et al.; Analysis of automated aircraft conflict resolution and weather avoidance (12 pages); American Institute of Aeronautics and Astronautics; Paper No. 2009-6995, Sep. 21, 2009; Moffett Field, CA 94035.

* cited by examiner

SYSTEMS AND METHODS FOR PREDICTING LOCATIONS OF WEATHER RELATIVE TO AN AIRCRAFT

BACKGROUND OF THE INVENTION

Aircraft pilots use information regarding the location of potentially hazardous weather to decide on the routing to their destination. This information can come from a number of sources—such as pre-flight weather briefing, ground-based weather radar data, or on-board weather radar. Pilots use this information to decide if the weather will make it necessary to divert from the planned route. Generally this information provides location of weather at the present time, or earlier depending on the latency of the weather data. Since weather is often moving horizontally, the information on the location of the weather may not correspond to its location when the aircraft is close enough to be affected by the weather.

There has been a great deal of work done by numerous organizations on the tracking of hazardous weather. Tracking is typically done by identifying features that are recognizable over some period of time, and observing the movement of these features. These features are typically detected using radar. Convective weather shows significant variation in radar reflectivity—and also is responsible for much of the weather-related hazard pilots wish to avoid—so convection more readily produces identifiable features that can be tracked. By observing the change in position of a convective cell over time, the velocity vector of the cell can be estimated.

Cell tracking is often applied to ground-based weather radar data. The goal is to determine if a hazardous storm cell is moving in the direction of businesses, homes, farms, etc. that might suffer damage as a result. Conveying the information regarding cell motion on a plan view display typically involves drawing a vector from the current cell location and extending the vector in the direction of motion. The length of the vector shows the expected distance that the cell will travel in a fixed period of time. The user of this information compares the displayed cell motion with the location of assets of concern (which typically are fixed in location). If the convection was seen to be moving toward a location of interest, dividing the distance from the cell to that location by the cell speed provides the expected time of arrival of the weather.

For an aircraft pilot, the use of cell track information involves determining if the convective cell will require a diversion from the planned route. This determination is complicated by the fact that the aircraft is in motion. So the pilot must determine if a cell will intersect the planned route at the time that the aircraft is at or near that point. This requires some time-consuming calculation on the part of the pilot by considering the speed and direction of the aircraft and the speed and direction of the convection to make the determination of whether a diversion should be anticipated.

SUMMARY OF THE INVENTION

The present invention provides systems and methods for predicting when a weather anomaly (e.g., convective cell) will intersect with an aircraft. In an example method location, direction of movement and velocity information for at least one weather anomaly are received at a processor from a radar system. An intercept point for the at least one weather anomaly is determined based on the received location, direction of movement and velocity information and location and current speed information for the aircraft. Then, a first indicator based on the intercept point is displayed on a display device.

In one aspect of the invention, a second indicator that associates the intercept point with the associated weather anomaly is displayed. The second indicator includes a line connected between the weather anomaly and the first indicator.

In another aspect of the invention, the first indicator is displayed if the determined intercept point is within a threshold distance of a predefined flight path of the aircraft.

In still another aspect of the invention, the first indicator is displayed if the determined intercept point is one of a predetermined number of the closest intercept points to a predefined flight path of the aircraft.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
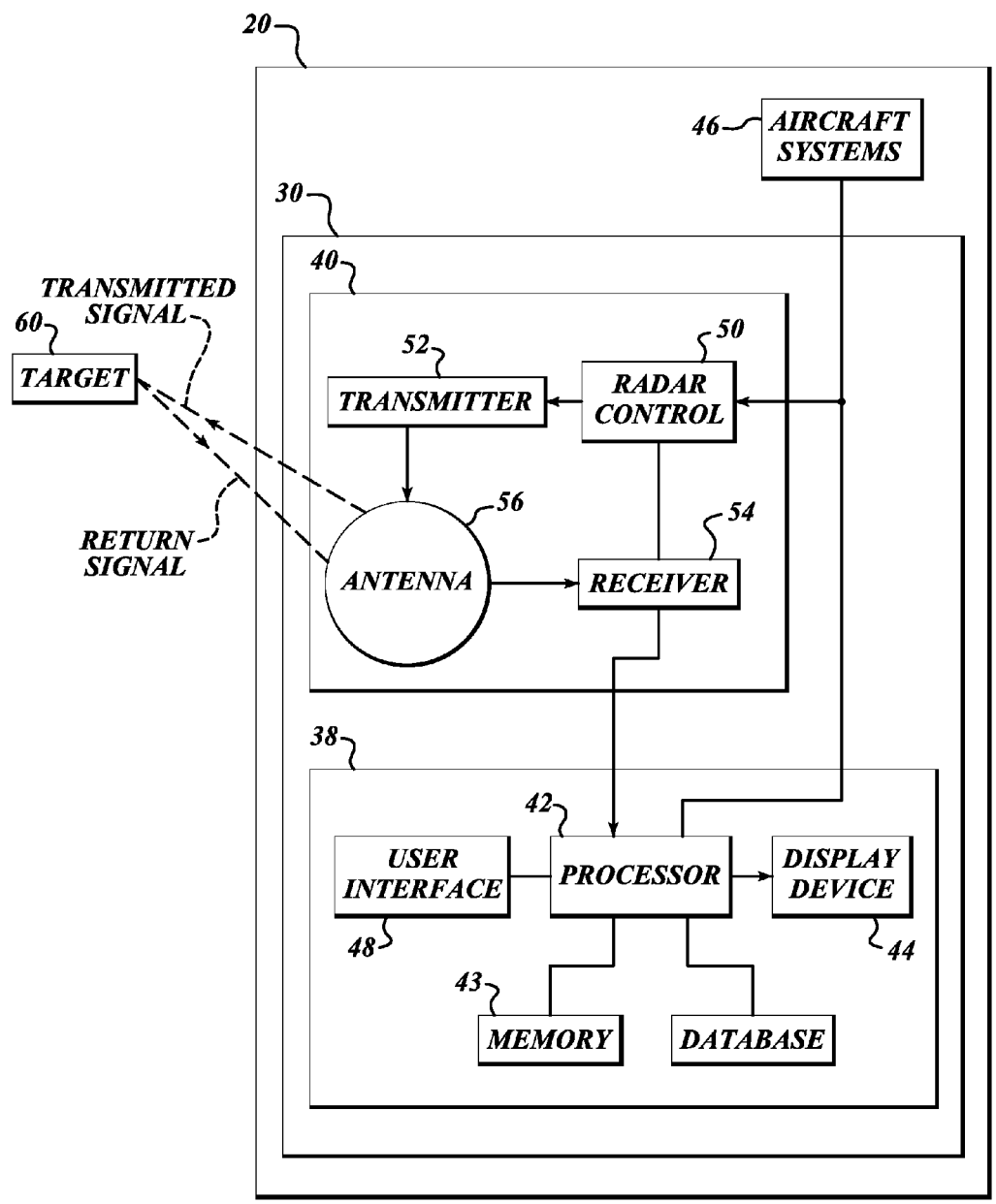
FIG. 1 illustrates an example radar system formed in accordance with an embodiment of the present invention.

FIG. 1 illustrates an example system 30 for predicting when a weather anomaly (e.g., convective cell) will intersect with an aircraft 20. The system 30 includes a radar display system 38 that includes a weather radar system 40, a display processor 42, memory 43, a display device 44, and a user interface 48 coupled to the display processor 42. The aircraft 20 also includes other aircraft systems 46, such as an air data computer (ADC), that are in signal communication with the weather radar system 40 and the radar display system 38. The display processor 42 is electrically coupled to the radar system 40, the display device 44, the ADC 46, and the memory 43. The radar system 40 includes a radar controller 50, a transmitter 52, a receiver 54, an antenna 56, and an antenna controller 61. The radar controller 50 controls the transmitter 52 and the receiver 54 for performing the transmitting and receiving of signals through the antenna 56 based on the selected radar mode and other pilot inputs received from the user interface 48, and aircraft data (i.e., altitude, speed, position, heading, roll, yaw, pitch, etc.) received from the ADC 46, a Flight Management System (FMS), Inertial Navigation System (INS), and/or Global Positioning System (GPS) (not shown). The ADC 46 generates air data based on signals received from various aircraft flight systems.

The radar system 40 transmits radar signals from the transmitter 52 and directed out the antenna 56 into space, in a direction determined by the antenna controller 61, and detects return signals with the receiver 54 if a target 60 is present to scatter energy back to the receiver. Preferably, the radar system 40 digitizes the return signals (i.e., reflectivity data or turbulence data) and sends the digitized signals to the display processor 42. The display processor 42 translates the received return signals for storage in a multi-dimensional buffer in the memory 43. The display processor 42 then generates a two-dimensional image for presentation on the display device 44 based on any control signals sent from the user interface 48 or based on signals from the radar system 40 (such as predictive wind-shear alerts).

The display processor 42 generates a display of convective cell motion on the display device 44 such that a pilot can immediately determine if the convective cell will warrant a deviation from the planned route. The generated display presents an indication of the expected position of the cell at a time of intercept with the aircraft if the aircraft were to maintain current speed and adjust heading to intercept the moving cell at the time of intercept. The pilot can then compare the interception point to the current route to determine if there will be sufficient clearance from the cell to continue safely or if a diversion should be planned.

The interception point is computed as follows. It is assumed that a convective cell is being tracked by a tracking function performed by the processor 42. The tracking function provides a filtered cell position and velocity in the earth-fixed horizontal plane. The tracking function involves taking noisy measurements of cell position taken over time and estimating actual cell position and velocity. The cell position obtained from the tracking process would be considered a better position (filtered) than just taking the noisy measurements. Also, the tracking function could extrapolate cell position during the time interval between the measurements.

Figure 2:
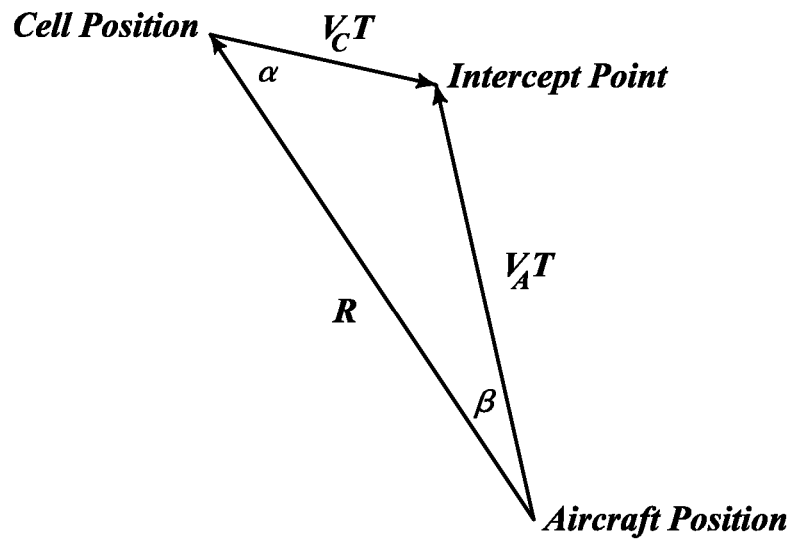
FIG. 2 is a illustration showing a geometric relationship between an aircraft and weather cell.

FIG. 2 shows the cell position and the cell's direction of motion with speed vector $V_C T$. The distance between the current aircraft position and current cell position is distance R. The aircraft's speed is shown as a vector $V_A T$ to the intercept point. The speed vector $V_A T$ is not intended to be the current aircraft velocity vector, but it is the speed vector $V_A T$ with magnitude equal to the current aircraft speed in the direction from the current aircraft position to the intercept point. So if the pilot wished to intercept the cell, vector $V_A T$ is the direction the aircraft would need to fly.

To find the intercept point, the time to the intercept point is computed. Thus, $$R = V_C T \cos \alpha + V_A T \cos \beta, \quad (1)$$

where T is the time to the intercept point. Solving for T, $$T = \frac{R}{V_C \cos \alpha + V_A \cos \beta}. \quad (2)$$

The value of R is easily calculated using the known positions of both the cell and the aircraft. The first term in the denominator can be computed from the dot product $$V_c \cos \alpha = -\vec{V}_C \cdot \hat{R}, \quad (3)$$

where $\hat{R}$ is the unit vector in the direction of the cell with respect to the aircraft position, and $\vec{V}_C$ is the cell velocity vector. The second term can be computed as follows:

$$V_A \cos \beta = [V_A^2 \sin \beta)^2]^{1/2} \quad (4)$$

Using the relation $V_A \sin \beta = V_C \sin \alpha$, the above can be written as:

$$V_A \cos \beta = [V_A^2 - (V_C \sin \alpha)^2]^{1/2} = [V_A^2 - (V_C^2 - (V_C \cos \alpha)^2)]^{1/2} \quad (5)$$

Using the results of equations (3) and (5) in equation (2) allows the computation of the time to intercept (T). Then the intercept point is given by $$\vec{R} + \vec{V}_C T \quad (6)$$

Figure 3:
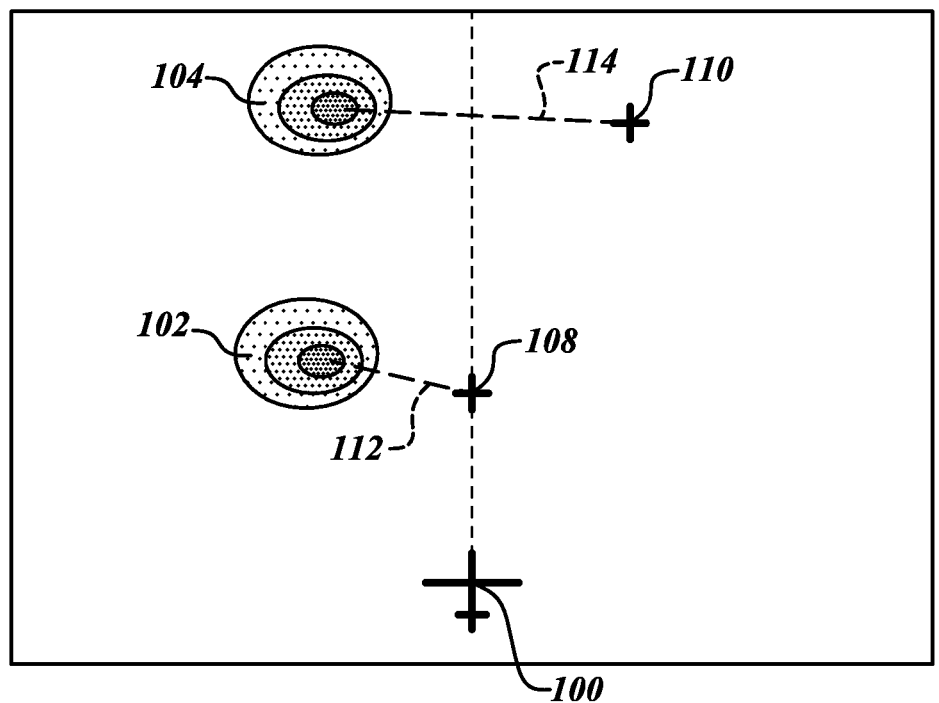
FIG. 3 illustrates a screen shot of a plan view weather radar display formed in accordance with an embodiment of the present invention.

The display of cell motion includes displaying an indication of the intercept point and an indication of which convective cell is expected to move to that point. FIG. 3 shows an example. It is assumed that a flight plan/path for an aircraft (icon 100) is a straight path ahead of the aircraft. Two convective cells 102, 104 are shown on a plan view weather display. Both cells are roughly equidistant from the flight plan/path (shown as a dotted line extending from the aircraft icon 100) and are moving with essentially the same speed towards the flight plan. The predicted intercept points 108, 110 are shown as black crosses. Black dashed lines 112, 114 show the path of the cells 102, 104 to the respective intercept points 108, 110.

The cross may be presented differently depending upon what level of threat the future position of the cell has. For example, if the cross of the intercept point 108 is displayed in amber or is flashing, but the cross of the intercept point 110 is not.

Because the cells 102, 104 have the same speed, the further cell 104 will have traveled a longer distance by the time the aircraft gets near. With this additional time, the cell 104 will have crossed the flight plan/path ahead of the aircraft icon 100 and will not interfere with aircraft operations. On the other hand, it will take less time for the aircraft icon 100 to approach the closer cell 102, so the distance the cell 102 will travel to reach the intercept point 108 is shorter. As a result, the intercept point 108 is predicted to be very near the flight path and so would warrant a deviation.

In one embodiment, only the intercept points within a threshold distance from the aircraft's flight path/plan are presented on the display device 44.

In another embodiment, if a plurality of active cells are within a predefined vicinity of the aircraft, then only a threshold number of intercept points are displayed. For example, only the five intercept points that are closest to the aircraft's flight path/plan are presented on the display device 44.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed by a radar system aboard an aircraft, the method comprising:
    receiving location, direction of movement and velocity information for at least one weather anomaly;
    determining an intercept point for the at least one weather anomaly based on the received location, direction of movement and velocity information and location and current speed information for the aircraft;
    displaying the intercept point as a first indicator on a display device; and
    displaying a second indicator that associates the intercept point with the associated weather anomaly,
    wherein the second indicator comprises a line connected between the weather anomaly and the first indicator.

2. The method of claim 1, wherein the weather anomaly is a convective cell.

3. The method of claim 1, wherein displaying comprises displaying the first indicator if the determined intercept point is within a threshold distance of a predefined flight path of the aircraft.

4. The method of claim 1, wherein displaying comprises displaying the first indicator if the determined intercept point is one of a predetermined number of the closest intercept points to a predefined flight path of the aircraft.

5. A system located on an aircraft, the system comprising:
    a radar component configured to receive reflectivity data;
    a processor configured to determine location, direction of movement and velocity information for at least one weather anomaly based on the reflectivity data, determine an intercept point for the at least one weather anomaly based on the received location, direction of movement and velocity information and location and current speed information for the aircraft, and generate a first indicator based on the determined intercept point; and a display device configured to display the first indicator, wherein the processor is further configured to generate a second indicator that associates the intercept point with the associated weather anomaly, wherein the display device is further configured to display the second indicator, wherein the second indicator comprises a line connected between the weather anomaly and the first indicator.

6. The system of claim 5, wherein the weather anomaly is a convective cell.

7. The system of claim 5, wherein the processor generates the first indicator if the determined intercept point is within a threshold distance of a predefined flight path of the aircraft.

8. The system of claim 5, wherein the processor generates the first indicator if the determined intercept point is one of a predetermined number of the closest intercept points to a predefined flight path of the aircraft.

9. A system located on an aircraft, the system comprising:
a means for receiving location, direction of movement and velocity information for at least one weather anomaly;
a means for determining an intercept point for the at least one weather anomaly based on the received location, direction of movement and velocity information and location and current speed information for the aircraft; and
a means for displaying the intercept point as a first indicator on a display device; and
a means for displaying a second indicator that associates the intercept point with the associated weather anomaly,
wherein the second indicator comprises a line connected between the weather anomaly and the first indicator.

10. The system of claim 9, wherein the weather anomaly is a convective cell.

11. The system of claim 9, wherein the means for displaying displays the first indicator if the determined intercept point is within a threshold distance of a predefined flight path of the aircraft.

12. The system of claim 9, wherein the means for displaying displays the first indicator if the determined intercept point is one of a predetermined number of the closest intercept points to a predefined flight path of the aircraft.

* * * * *